A. S. PELTON.
Thrashing Machine.
No. 7,368.
Patented May 14, 1850.
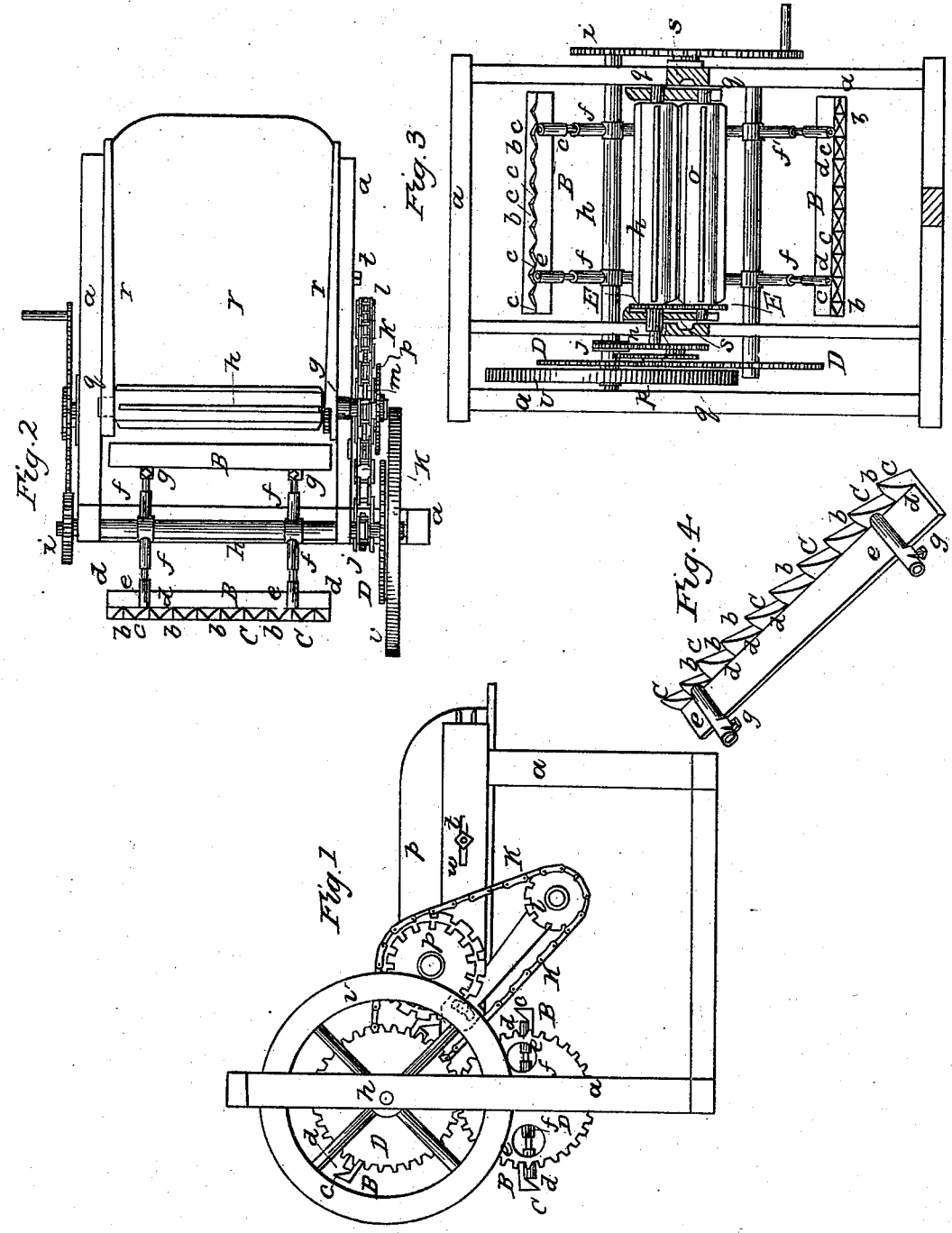

UNITED STATES PATENT OFFICE.

A. S. PELTON, OF CLINTON, CONNECTICUT.

THRESHING-MACHINE.

Specification of Letters Patent No. 7,368, dated May, 14, 1850.

*To all whom it may concern:*

Be it known that I, A. S. PELTON, of Clinton, Middlesex county, Connecticut, have invented new and useful Improvements in Machines for Treshing Grain, to be called "Pelton's Hand Threshing-Machine;" and I do hereby declare the following to be a full, clear, and exact description of the same, reference being had to the annexed drawings, making part of this specification.

My improvements, although all of them have reference to one object—namely, the effective separation of the grain from the hull and straw, are of a two fold character, and consist, firstly, in such a form and arrangement of beaters, as shall effectually expel the grain from the heads without dissevering the latter from their stalks or allowing the latter to clog and thereby retard the action of the beaters, and secondly in the adapability of the machine to different and varying actions on the grain, partly by the adjustability of the beaters and partly the mobility of the feeding apparatus.

In the annexed drawings Figure 1 is a side elevation. Fig. 2 is a top view—the cap of the frame being removed to show the threshers. Fig. 3 is a vertical section through the axes of the feed rollers. Fig. 4 is a perspective view of one of the beaters.

$a$ is the external frame work of the machine.

The beaters B, of which in the present illustration (there are two in each thresher) consist each of a single plate bent into two flanges diverging rectangularly from each other—one of these flanges is serrated in the manner shown—that is to say it is made to consist of teeth having an angular outline $b$ and chamfered off at other points $c$ thus leaving their inner face $d$ beveled. The other flange is furnished with sockets or bushes $e$ which receive within them the extremities of the arms $f$. A set screw $g$ is used to fasten the beaters to any desired distance from their shaft.

The upper beater shaft $h$ carries at one end a pinion $i$ operated by a winch and spur wheel, and both shafts carry at their other ends a pair of match wheels D by which the motion of the upper thresher is repeated by the lower one, but in the opposite directions. The same end of the upper shaft is also furnished with teeth $j$ adapted to the links of an endless chain $k$ which passing around an idler pulley $l$—thence meshes in the wheel $m$, which is attached to the upper feed roller $n$. The two feed rollers $n$, $o$, are geared together as usual by pinions E.

The upper feed roller $n$ may have a set of several different sized driving wheels $m$ $p$ and thus the rate of feed may be regulated; the journal boxes $q$ of the feed rollers are arranged in the sliding feed frame or trough $r$—this trough has tongues which rest in grooves $s$, or other guides in the frame, and is so arranged that it can be moved to and fro even during the operation of the machine. A screw pin $t$ is connected to the trough; and there is a slot $u$ in the frame, in order that the play of the trough may be controlled—or that it may, when required, be fixed at any desired distance from the threshers. The upper shaft $h$ carries a fly wheel $v$.

The operation is as follows:—The feed trough ($r$) being either fixed in the desired position, or left free to be drawn to and fro at the option of the operator, the machinery is set in motion and the bundles are untied and fed in through between the rollers $n$ $o$ in the usual way, with this exception, that is the trough $r$ is left free it may be slid forward after the ears have passed through and in this way the butts may be passed through in a more expeditious manner.

The peculiar chamfered and serrated character of the threshers B enables them to gather and to retain the heads, and the blow imparted by the radial or plain flanges completes the operation—and the plain flange, in this particular combination with the chamfered and serrated one, effectually lessens the tendency of the head or ear, to be bent backward and snapped off its stalk before the grain is out when the beater happens to strike its neck by which imperfect operation so much loss is now sustained. This peculiar chamfered form of the tooth is also found very effective in freeing the straw from the threshers and thereby doing away with the common liability of threshers to catch and clog themselves with straw.

It will be seen that the chain is so arranged as to be uniformly taught and effective in any position of the trough and whether it be in motion or at rest.

Having described the nature of my improvement and its mode of operation, what I claim as my invention and desire to secure by Letters Patent is—

The peculiar serrated and duplex conformation of the beaters B—substantially after the manner and for the objects herein described—that is to say consisting of a pair of plates B and c, c, c, diverging rectangularly from each other—and the latter consisting of teeth chamfered off from their inner side at their points as represented at Fig. 4.

In testimony whereof I have hereunto signed my name before two subscribing witnesses.

A. S. PELTON.

Witnesses:
CHARLES A. ELLIOT,
JOHN D. LIPPINGSWELL.